United States Patent
Armacanqui et al.

(10) Patent No.: US 6,872,489 B2
(45) Date of Patent: Mar. 29, 2005

(54) ALKALINE CELL WITH GASSING INHIBITORS

(75) Inventors: Edgar M Armacanqui, Madison, WI (US); Ernest Ndzebet, Middleton, WI (US); Jeffrey Poirier, Madison, WI (US)

(73) Assignee: Rovcal, Inc., Madison, WI (US)

( * ) Notice: Subject to any disclaimer, the term of this patent is extended or adjusted under 35 U.S.C. 154(b) by 113 days.

(21) Appl. No.: 10/090,137

(22) Filed: Feb. 27, 2002

(65) Prior Publication Data

US 2003/0162092 A1 Aug. 28, 2003

(51) Int. Cl.⁷ .............................. H01M 4/62; H01M 4/42
(52) U.S. Cl. ........................ 429/212; 429/217; 429/229
(58) Field of Search .......................... 429/59, 212, 217, 429/229, 230, 231

(56) References Cited

U.S. PATENT DOCUMENTS

| | | | |
|---|---|---|---|
| 3,918,989 A | * 11/1975 | Gillman et al. | ......... 429/217 X |
| 4,595,526 A | 6/1986 | Lai | |
| 4,777,100 A | 10/1988 | Chalilpoyil | |
| 5,128,222 A | * 7/1992 | Yoshizawa et al. | ..... 429/229 X |
| 5,401,590 A | 3/1995 | Chalilpoyil | |
| 5,912,208 A | 6/1999 | Hioki et al. | |
| 6,040,088 A | 3/2000 | Bennett | |
| 6,284,410 B1 | * 9/2001 | Durkot et al. | ............... 429/229 |
| 6,555,266 B1 | * 4/2003 | Woodnorth et al. | ..... 429/229 X |
| 6,586,385 B1 | 7/2003 | Wisniewski et al. | |
| 6,716,804 B2 | 4/2004 | Scherubel | |

FOREIGN PATENT DOCUMENTS

| | | | | |
|---|---|---|---|---|
| JP | 62-222568 | * | 9/1987 | ............ H01M/4/62 |
| JP | 1231272 A2 | | 9/1989 | |
| JP | 3071559 A2 | | 3/1991 | |
| JP | 5174826 A2 | | 7/1993 | |

OTHER PUBLICATIONS

Richard J. Lewis, Sr., Hawley's Condensed Chemical Dictionary, pp. 1055 and 1060, Twelth Edition, Van Nostrad Reinhold Company, New York.

* cited by examiner

Primary Examiner—Stephen J. Kalafut
(74) Attorney, Agent, or Firm—Quarles & Brady LLP

(57) ABSTRACT

A sulfonic acid type organic surfactant is incorporated into the gelled anode of an alkaline electrochemical cell, optionally with an organic phosphate ester surfactant. When the two surfactants are provided in a gelled anode in combination, discharge leakage is reduced and gel gassing is suppressed relative to that of gels lacking both surfactants. Additionally, cell discharge performance is improved relative to that of cells lacking both surfactant additives.

20 Claims, No Drawings

US 6,872,489 B2

ALKALINE CELL WITH GASSING INHIBITORS

CROSS-REFERENCE TO RELATED APPLICATIONS

Not applicable.

STATEMENT REGARDING FEDERALLY SPONSORED RESEARCH OR DEVELOPMENT

Not yet determined.

BACKGROUND OF THE INVENTION

Zinc anode gels of alkaline electrochemical cells are prone to electrochemical corrosion reactions when stored at or above room temperature. The alkaline electrolyte in the anode gel corrodes the zinc anode upon contact, forming oxidized zinc products that decrease the availability of active zinc while simultaneously generating hydrogen gas. The rate of corrosion increases as the storage temperature rises and can lead to a dramatic decrease in cell capacity.

Hydrogen gas generated in such reactions can increase the internal cell pressure, cause electrolyte leakage and disrupt cell integrity. The rate at which the hydrogen gas is generated at the anode zinc surface accelerates when the battery is partially discharged, thereby decreasing the battery's resistance to electrolyte leakage. The electrochemical corrosion reactions that lead to hydrogen evolution involve cathodic and anodic sites on the zinc anode surface. Such sites can include surface and bulk metal impurities, surface lattice features, grain boundary features, lattice defects, point defects, and inclusions.

To minimize undesirable corrosion and gassing during storage, it is typical to employ corrosion-resistant zinc alloys and to reduce the extent of impurities in the anode. Additionally, organic surfactants and inorganic corrosion-inhibiting agents are commonly added to zinc anodes. Surfactants act at the anode-electrolyte interface by forming a hydrophobic film that protects the zinc anode surface during storage. The inhibitive efficiency of surfactants to increase the corrosion resistance of zinc depends on their chemical structure, concentration, and their stability in the electrolyte.

Among the surfactants known to be effective at controlling gassing are organic phosphate esters such as the ethylene oxide-adduct type disclosed by Rossler et al. in U.S. Pat. No. 4,195,120, incorporated herein by reference. In U.S. Pat. No. 4,777,100, Chalilpoyil et al. disclosed an anode containing single crystal zinc particles with a surface-active heteropolar ethylene oxide additive including organic phosphate esters. In U.S. Pat. No. 5,378,559, Randell et al. disclose a galvanic cell that contains a phosphate ester compound to reduce gassing attributed to the brass anode current collector.

Despite their ability to control gel gassing and cell gassing, organic phosphate ester corrosion-inhibiting surfactants also typically decrease high rate discharge performance in electrochemical cells and can adversely affect intermittent cell discharge performance. Therefore, new approaches are sought for inhibiting corrosion and preventing leakage without simultaneously reducing high rate cell discharge performance. At the same time, it is also of interest to develop new classes of corrosion-inhibiting surfactants for use in gelled anodes of alkaline electrochemical cells.

BRIEF SUMMARY OF THE INVENTION

The present invention is summarized in that acceptable gel gassing levels are maintained when the gel of an alkaline electrochemical cell contains a surfactant having the general formula Y $SOx^-$ where preferably x=3 or x=4 and Y preferably is selected from an alkyl group, an aryl group, an alkylaryl group, and a carboxy acid group [$(CH_2)_n$—$COO^-$], or a salt of any of the foregoing, where the number of carbon atoms, n, in an alkyl chain preferably ranges from 1 to about 26. To the knowledge of the inventors, sulfonated or sulfated acid type surfactants have not previously been employed in gelled anodes, but are shown herein to effectively help inhibit discharge leakage and to maintain cell integrity.

The invention is further summarized in that unexpected and advantageous benefits are recognized when the aforementioned acid type surfactant or salt thereof is used in combination with a phosphate ester surfactant that can be added to the gelled anode in an amount ranging from 0.0005% to 1%. For example, cell reliability can be maintained and cell gassing can be suppressed.

It is an object of the present invention to provide a class of surfactants for reducing gelled anode gassing in an alkaline electrochemical cell.

It is another object of the present invention to provide a gelled anode mix comprising a mixture of organic surfactants for both controlling gel gassing and suppressing cell discharge performance loss when stored at high temperature.

It is a feature of the invention that a gelled anode mix for use in an anode of an alkaline electrochemical cell contains a sulfonated or sulfated organic acid type organic surfactant and optionally contains an organic phosphate ester surfactant.

It is an advantage of the present invention that gel gassing is controlled in an alkaline electrochemical cell that includes a sulfonic acid type surfactant in the gelled anode mix.

It is another advantage of the present invention that gel gassing is controlled and cell discharge performance is maintained in an alkaline electrochemical cell that includes both a sulfonated or sulfated organic acid type organic surfactant and an organic phosphate ester surfactant in the gelled anode mix.

Other objects, features, and advantages of the present invention will become apparent upon consideration of the following detailed description.

BRIEF DESCRIPTION OF THE SEVERAL VIEWS OF THE DRAWINGS

Not applicable.

DETAILED DESCRIPTION OF THE INVENTION

The present invention relates to the use of a sulfonated or sulfated organic acid surfactant alone or in combination with an organic phosphate ester surfactant. In the present invention, the inhibitor(s) are added into the gelled anode of an alkaline electrochemical cell.

A gelled anode mixture, a gelled anode, and an electrochemical cell containing the gelled anode can have the structures of and can be prepared as described in U.S. Pat. No. 6,040,088, incorporated by reference herein as if set for in its entirety, except as detailed below.

A suitable gelled anode according to the invention comprises a metal alloy powder (preferably an alloyed zinc powder), a gelling agent and an alkaline electrolyte. The skilled artisan can readily select a suitable zinc alloy powder and an alkaline electrolyte from those known to the art. It is noted that known gelling agents other than the sodium polyacrylate gelling agent described in the incorporated patent are suitable for use in the present invention. Such gelling agents include carboxymethyl cellulose, crosslinking-typed branched polyacrylate acid, natural gum, and the like.

A preferred sulfonated or sulfated organic acid type organic surfactant has the general formula Y SOx⁻ where preferably x=3 or x=4 and Y is preferably selected from an alkyl group, an aryl group, and alkylaryl group, and an carboxy acid group [$(CH_2)_n$—$COO^-$], or a salt of any of the foregoing, where the number of carbon atoms, n, in an alkyl chain ranges from 1 to about 26. Among these surfactants, octadecanoic acids, such as oleic acid, and salts thereof are preferred. A particularly preferred agent is a sodium salt of sulfated oleic acid commercially available under the trade name Witconate™ 1840X, Dyasulf 2031, Dymosol 2031, Freedom SOA-70, and Freedom SOA-70WV. Other suitable sulfonated aryl, alkyl aryl, or alkyl compounds include other Witconate surfactants such as Witconate 90FH, Witconate 93S, Witconate 605A, and Witconate 1260.

The sulfated organic acid type surfactant is advantageously provided in the gelled anode mix at a concentration ranging from between about 0.0005% to about 0.5% relative to the weight of the metal in the gelled anode, more preferably at between about 0.001% and about 0.1%, and most preferably at between about 0.01% and 0.02%. In the stated ranges, the sulfonated organic surfactant maintains desirable gel characteristics as described herein. In the stated ranges, and in the presence of a phosphate organic ester, the sulfonated organic surfactant effectively suppresses overdischarge leakage while reducing gel gassing and improving on intermittent discharge performance. Overdischarge leakage is reduced by at least 20%, more preferably by at least 50%, and most preferably to 0, relative to cells lacking these surfactants.

EXAMPLES

Table 1 shows that the three-day gassing rate of gels containing the sulfonated surfactant and the phosphate ester in combination was appreciably suppressed relative to that of surfactant-free gels or to that of gels containing either surfactant alone. The gels of Table 1 were supplemented as shown either with RM-510 to 0.0035%, with Witconate 1840X to 0.0125%, or with both surfactants at the same concentrations, relative to the weight of zinc in the anode gel.

TABLE 1

| Description of Gel sample | Three-day Gel Gassing µl/g/day |
| --- | --- |
| No inhibitor | 6.2 ± 1.0 |
| RM-510 | 5.4 ± 0.9 |
| Witconate 1840X | 6.8 ± 0.6 |
| Witconate 1840X + RM-510 | 3.9 ± 0.5 |

Table 2 summarizes partial discharge cell gassing measured in LR03 cells after discharge at 7.5 ohm to a 1.0 volt end voltage and storage for two weeks at 160° F. Overdischarge leakage was measured after continuous discharge at 10 ohms for 48 hours followed by room temperature storage for five weeks. Discharge performance of LR03 cells at 600 mA during 10 seconds per minute for 1 hour a day, was improved over the discharge performance of cells containing the phosphate ester alone. The gelled anode of otherwise conventional alkaline LR03 cells contained RM-510 to about 0.0035% either alone or in combination with Witconate 1840X to about 0.0125%, the amount of both surfactants being measured relative to the weight of zinc alloy in the anode.

TABLE 2

| | Overdescharge Leakage % | Partial Discharge Cell Gas M1 | 600 mA Pulse No-delay Cycles to 0.9 V |
| --- | --- | --- | --- |
| Witconate + RM-510 | 20 | 0.36 ± 0.11 | 390.4 ± 3.5 |
| RM-510 | 60 | 0.50 ± 0.23 | 362.2 ± 13.8 |

Further, Table 3 shows that the discharge performance at 500 mA of continuous discharge of the LR03 cells containing both surfactants in the gelled anode was superior to that of the cells that contained only the phosphate ester additive. Table 3 also shows that the high-rate constant current discharge performance after high temperature storage was significantly better in the LR03 cells containing both surfactants than in cells containing the phosphate ester alone.

TABLE 3

| | 500 mA No-Delay Minutes to 0.9 V | 500 mA 14 days at 130° F. Minutes to 0.9 V |
| --- | --- | --- |
| Witconate + RM-510 | 52.6 ± 2.8 | 55.6 ± 1.7 |
| RM-510 | 48.0 ± 0.9 | 53.0 ± 1.7 |

The present invention is not intended to be limited to the foregoing embodiments, but rather to encompass all such modifications and variations as come within the scope of the appended claims.

We claim:

1. A gelled anode mixture comprising a metal alloy powder, a gelling agent, an alkaline electrolyte, and a surfactant having the general formula Y SOx⁻ or a salt thereof in an amount sufficient to reduce gassing and maintain performance relative to an anode lacking the surfactant, wherein x is 3 or 4, and wherein Y is selected from the group consisting of an alkyl group, an aryl group, an alkylaryl group, and a carboxy acid group.

2. A gelled anode mixture as claimed in claim 1 wherein Y is further selected from a salt of at least one of the groups.

3. A gelled anode mixture as claimed in claim 1 wherein the surfactant is a salt of a sulfated octadecanoic acid.

4. A gelled anode mixture as claimed in claim 1 wherein the surfactant is a sodium salt of sulfated oleic acid.

5. A gelled anode mixture as claimed in claim 1 further comprising an organic phosphate ester surfactant.

6. A gelled anode mixture as claimed in claim 5 wherein the organic phosphate ester surfactant is an ethylene oxide-adduct organic phosphate ester.

7. An alkaline electrochemical cell comprising:
a positive current collector;
a cathode in contact with the positive current collector;
a gelled anode comprising a alloyed zinc powder, a gelling agent, an alkaline electrolyte, and a surfactant having the general formula Y SOx⁻ or a salt thereof in an amount sufficient to reduce gassing and maintain performance relative to a cell lacking the surfactant, wherein x is 3 or 4, and wherein Y is selected from the group consisting of an alkyl group, an aryl group, an alkylaryl group, and a carboxy acid group;
a separator between the cathode and the anode; and
a negative current collector in electrical contact with the anode.

8. An alkaline electrochemical cell as claimed in claim 7 wherein the surfactant is a salt of a sulfated octadecanoic acid.

9. An alkaline electrochemical cell as claimed in claim 7 wherein the surfactant is a sodium salt of sulfated oleic acid.

10. An alkaline electrochemical cell as claimed in claim 7 further comprising an organic phosphate ester surfactant.

11. An alkaline electrochemical cell as claimed in claim 10 wherein the organic phosphate ester surfactant is an ethylene oxide-adduct organic phosphate ester.

12. An alkaline electrochemical cell as claimed in claim 7 wherein Y is further selected from a salt of at least one of the groups.

13. A gelled anode mixture comprising a an alloyed zinc powder, a gelling agent, an alkaline electrolyte, a sodium salt of sulfated oleic acid and an ethylene oxide-adduct organic phosphate ester.

14. An alkaline electrochemical cell comprising an alloyed zinc powder, a gelling agent, an alkaline electrolyte, a sodium salt of sulfated oleic acid and an ethylene oxide-adduct organic phosphate ester.

15. A method for reducing gassing and maintaining cell performance in an alkaline electrochemical cell, the steps comprising:

providing a positive current collector;

placing a cathode in contact with the positive current collector;

providing a gelled anode comprising a alloyed zinc powder, a gelling agent, an alkaline electrolyte, and a surfactant having the general formula Y $SOx^-$ or a salt thereof in an amount sufficient to reduce gassing and maintain performance relative to a cell lacking the surfactant, wherein x is 3 or 4, and wherein Y is selected from the group consisting of an alkyl group, an aryl group, an alkylaryl group, and a carboxy acid group;

placing a separator between the cathode and the anode; and placing a negative current collector in electrical contact with the anode.

16. The method as recited in claim 15, wherein the surfactant is a salt of a sulfated octadecanoic acid.

17. The method as recited in claim 15, wherein the surfactant is a sodium salt of sulfated oleic acid.

18. The method as recited in claim 15, further comprising the step of providing an organic phosphate ester surfactant.

19. The method as recited in claim 18, wherein the organic phosphate ester surfactant is an ethylene oxide-adduct organic phosphate ester.

20. The method as recited in claim 15, wherein Y is further selected from a salt of at least one of the groups.

* * * * *

UNITED STATES PATENT AND TRADEMARK OFFICE
CERTIFICATE OF CORRECTION

| | |
|---|---|
| PATENT NO. | : 6,872,489 B2 |
| APPLICATION NO. | : 10/090137 |
| DATED | : March 29, 2005 |
| INVENTOR(S) | : Edgar M. Armacanqui et al. |

It is certified that error appears in the above-identified patent and that said Letters Patent is hereby corrected as shown below:

<u>Column 1, Line 11</u>

"Not yet determined." should read

-- The U.S. Government has a paid-up license in this invention and the right in limited circumstances to require the patent owner to license others on reasonable terms as provided for by the terms of Contract No. 99128200. --.

Signed and Sealed this

Twenty-seventh Day of February, 2007

JON W. DUDAS
*Director of the United States Patent and Trademark Office*